United States Patent

Benker

Patent Number: 5,850,281
Date of Patent: Dec. 15, 1998

[54] PHOTOGRAPH COPIER USING A DIFFUSING MEANS TO ENABLE SCANNING WITH A HARD LIGHT AND EXPOSURE WITH A SOFTER LIGHT

[75] Inventor: Gerhard Benker, Icking, Germany

[73] Assignee: AGFA-Gevaert AG —Fototechnik, Munich, Germany

[21] Appl. No.: 450,869

[22] Filed: May 26, 1995

[30] Foreign Application Priority Data

Jun. 14, 1994 [DE] Germany .......................... 44 20 661.5

[51] Int. Cl.⁶ .......................... G03B 27/54; G03B 27/72; G03B 27/80
[52] U.S. Cl. .................................. 355/71; 355/67; 355/77
[58] Field of Search .................................. 355/71, 67, 77; 396/111, 116; G03B 27/54, 27/32, 27/72

[56] References Cited

U.S. PATENT DOCUMENTS 5,170,127  12/1992  Henley .

5,414,490  5/1995  Kurokawa et al. ........................ 355/71

FOREIGN PATENT DOCUMENTS 63-60441 A    3/1988    Japan .
14 07 664     9/1975    United Kingdom .

Primary Examiner—Joan H. Pendegrass
Assistant Examiner—Herbert V. Kerner
Attorney, Agent, or Firm—Darby & Darby

[57] ABSTRACT

A photographic copier has a station which serves as a scanning station and a copying station. The station includes a support for an image to be scanned and copied, and a single light source for scanning and copying. A light-diffusing member is disposed between the light source and the support, and the light-diffusing member has a first condition for copying and a second condition for scanning. Light undergoes a high degree of diffusion in the first condition and a lower degree of, or substantially no, diffusion in the second condition.

9 Claims, 1 Drawing Sheet

PHOTOGRAPH COPIER USING A DIFFUSING MEANS TO ENABLE SCANNING WITH A HARD LIGHT AND EXPOSURE WITH A SOFTER LIGHT

BACKGROUND OF THE INVENTION

The invention relates generally to the reproduction of a master.

The German publication 34 37 222 discloses a copier in which a film with a plurality of frames is conveyed through a copying station and past a scanner in a first direction. The film, which is wound onto a reel, is scanned in its entirety during this operation. Thereafter, the film is advanced stepwise in the opposite direction and copied. The measurements obtained by the scanner are used to position the frames in the copying station and to regulate the amounts of copying light.

The German publication 42 05 922 illustrates a copier of the above type in which the same illuminating unit is employed for scanning and copying. However, it has been found that very soft light is required for copying in order to prevent scratches and dirt particles on a film frame from being reproduced on a copy of the frame. On the other hand, very hard light is required for scanning if signals of sufficient magnitude are to be obtained, particularly when spectral splitting of the scanning light occurs.

SUMMARY OF THE INVENTION

It is an object of the invention to provide an apparatus which enables soft and hard radiation to be obtained from the same radiation source.

Another object of the invention is to provide a method which makes it possible to derive soft and hard radiation from a single radiation source.

The preceding objects, as well as others which will become apparent as the description proceeds, are achieved by the invention.

One aspect of the invention resides in an apparatus for reproducing a master. The apparatus comprises means for irradiating a predetermined path, means for supporting the master at a first location of the path, means for scanning at least part of the first location, and means for supporting a reproduction medium at a second location of the path. The apparatus further comprises means for diffusing radiation, and means for placing the diffusing means in a first condition such that radiation in the path undergoes a first degree of diffusion and a second condition such that radiation in the path undergoes a lower second degree of, or substantially no, diffusion.

The apparatus can, for instance, be constituted by a photographic copier.

By controlling the condition of the diffusing means, it becomes possible, with one irradiating unit, to obtain hard radiation for scanning and soft radiation for reproduction. This means that a very economical apparatus employing a single irradiating unit for both scanning and reproduction can achieve results as good as those which were attainable until now only with two irradiating units. During reproduction, the diffusing means can be placed in a condition such that a diffusing action occurs. Very soft radiation, which generates high-quality reproductions, can then be produced. Although the accompanying scattering in all directions can cause a loss of radiation in an objective used for reproduction, the exposure time is not affected so strongly as to outweigh the advantages.

On the other hand, the loss would be too great during a scanning procedure where the radiation is split into spectral components thereof. As a result of reflections occurring because of the different angles of incidence of the diffused radiation (large spatial angle), the radiation arriving at the scanning means would be so weak that the signal-to-noise ratio would no longer be adequate. This is particularly true for dark regions of the master and for rapid scanning cycles. The preceding effect is especially noticeable when so-called Selfoc lenses are used as scanning objectives. By employing less diffuse, approximately aligned radiation which impinges an objective within a relatively small range of spatial angles, the loss of radiation can be limited to such an extent that the required measurement precision is achieved.

The irradiating means may include a source of radiation, and a filter unit for coloring the radiation, as well as a reflector tube for mixing the radiation, are advantageously disposed between the radiation source and the master. The diffusing means is preferably mounted in the region of the outlet of the reflector tube so that the radiation arrives at the master in a diffuse or an approximately aligned condition after being mixed and appropriately colored.

The scanning means may include measuring cells, and the radiation used for scanning can be directed onto the measuring cells by means of a reflector which is pivotable into and out of the optical path. This type of arrangement is shown, for example, in the German publication 40 40 498. It is preferred, however, for the scanning means to be moved into the optical path. Such an arrangement, and the advantages associated therewith, are described in the German publication 42 05 922.

A diffusing action can be achieved in various ways. The so-called NCAP foils (Nematic Curvular Aligned Phase foils) are particularly well-suited for rapid and simple switching between diffusing and non-diffusing conditions. Here, a liquid crystal is embedded between two plastic foils and can be electrically switched between "diffusing" and "non-diffusing".

A conventional diffusing disk may also be used and can be moved into and out of the optical path in any desired manner. By way of example, the diffusing disk may be provided with a pair of parallel edges and may be mounted for pivotal movement into and out of the optical path about an axis extending in parallelism with these edges. A crank drive can be used to effect pivoting of the diffusing disk.

Another aspect of the invention resides in a method of reproducing a master. The method comprises the steps of directing radiation along a predetermined path, scanning the master while in the path using the radiation, and reproducing the master while in the path using the radiation and the results of the scanning step. The method additionally comprises the step of changing the degree of diffusion of the radiation between the scanning and reproducing steps such that the radiation has a first degree of diffusion during the reproducing step and a lower second degree of, or substantially no, diffusion during the scanning step.

BRIEF DESCRIPTION OF THE DRAWINGS

Additional features and advantages of the invention will be forthcoming from the following detailed description of preferred embodiments when read in conjunction with the accompanying drawings.

The sole FIGURE schematically illustrates an apparatus designed to reproduce masters in accordance with the invention.

DESCRIPTION OF THE PREFERRED EMBODIMENTS

Figure 1:
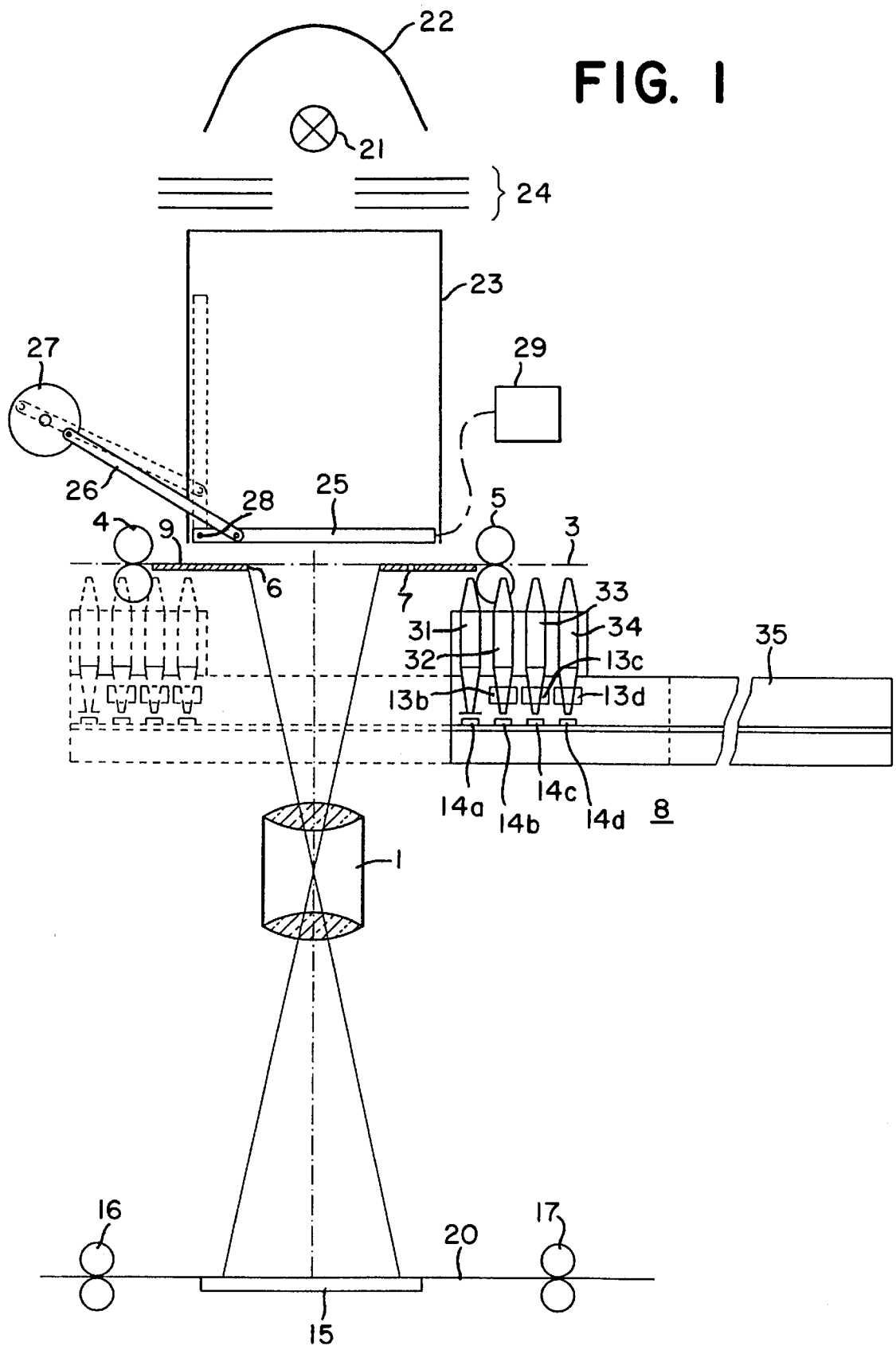

The FIGURE shows an apparatus for the reproduction of masters, and the apparatus is here in the form of a photographic copier which is designed to make copies or prints of transparent masters.

The numeral 3 identifies a film containing a series of transparent frames or masters which are to be copied or reproduced. The copier includes a platform or support 9 having a window or opening 6, and a frame to be copied is placed in registry with the window 6. An objective 1 sharply focuses a frame positioned in the window 6 on a reproduction medium in the form of copying paper 20.

The objective 1 has a vertical optical axis, and a light source or radiation source 21 is disposed above the platform 9 in alignment with the optical axis of the objective 1. A reflector tube 23 is located between the light source 21 and the platform 9, and a filter unit 24 is situated intermediate the reflector tube 23 and the light source 21. Light from the source 21 is deflected downward by a reflector 22 arranged above the light source 21, and the reflected light travels through the filter unit 24 and the reflector tube 23 towards the window 6. The light exiting the reflector tube 23 passes through a frame positioned in the window 6.

The filter unit 24 colors different portions of the reflected light differently. The reflector tube 23, which may also be referred to as a mixing tube or shaft, functions to mix the differently colored portions of the reflected light so that the light leaving the reflector tube 23 is homogenized.

The light source 21 and the reflector 22 each constitute part of a means for illuminating or irradiating a predetermined optical path which extends in the direction of and includes the optical axis of the objective 1.

Light deflected by the reflector 22 enters the reflector tube 23 through the upper or inlet end of the tube 23 and exits the reflector tube 23 via the lower or outlet end thereof. A diffusing disk or disk-like diffusing member 25 is mounted in the region of the lower end of the reflector tube 23. The diffusing disk is pivotable about a pivot axis 28 between a position shown in full lines and a position shown in broken lines. In the full line position, the diffusing disk 25 traverses the optical path at the lower end of the reflector tube 23 so that light leaving the reflector tube 23 is diffuse and soft. On the other hand, when the diffusing disk 25 is in the broken line position, the diffusing disk 25 lies to one side of the optical path and cannot diffuse the light travelling through the reflector tube 23. The light source 21, reflector 22 and reflector tube 23 are designed in such a manner that the light exiting the reflector tube 23 is then hard and more or less aligned.

In the illustrated embodiment, the diffusing disk 25 has a pair of parallel edges, and the pivot axis 28 of the diffusing disk 25 extends in parallelism with such edges. The diffusing disk 25 is driven by a crank drive which comprises a crank 27 and a crankshaft 26. The crankshaft 26 connects the crank 27 and the diffusing disk 25 to one another. The operation of the crank drive is regulated by a control unit 29.

The photographic copier shown works on the same principle as that disclosed in the German publication 34 37 222. Thus, the film 3 is first conveyed from left to right. As the frames of the film pass by the window 6, the frames are scanned by a scanner or scanning unit 8 using the light generated by the light source 21. Downstream of the window 6 as considered in a direction from left to right, the film 3 is wound onto a nonillustrated reel.

When the entire film 3 has been scanned, the direction of travel of the film 3 is reversed and the film 3 is transported from right to left in steps. A different frame of the film 3 is positioned in the window 6 after each step, and the frame in the window 6 is copied onto the copying paper 20 using the light from the light source 21. The measurements obtained during the scanning procedure are employed to properly position the frames in the window 6 and to regulate the amounts of copying light.

A pair of transport rollers 4 for the film 3 is arranged upstream of the window 6 as considered from left to right. When the film 3 is to be conveyed from left to right, the transport rollers 4 grip the leading end of the film 3 and advance the leading end to the right along guides. Downstream of the window 6 as considered from left to right, the leading end of the film 3 is engaged by a second pair of film transport rollers 5 which convey the film 3 to the previously mentioned reel in a conventional manner.

The rollers 4, 5 constitute a means for positioning the frames of the film 3 in the optical path of the copier in register with the window 6.

When a frame of the film 3 is to be copied, an unexposed section of the copying paper 20 is brought into alignment with the window 6. This section, which is exposed during copying, is transported away from the window 6 after the frame has been copied while a new unexposed section of the copying paper 20 is moved into register with the window 6. A platform or support 15 is aligned with the window 6, and the platform 15 supports a section of the copying paper 20 as such section is exposed during copying.

A pair of transport rollers 16 for the copying paper 20 is situated upstream of the window 6 as considered from left to right whereas a second pair of transport rollers 17 is located downstream of the window 6. The rollers 16,17 constitute a means for positioning unexposed sections of the copying paper 20 in the optical path of the copier on the platform 15.

The scanner 8 includes four rows of imaging or focusing elements 31, 32, 33 and 34, and the rows 31–34 are perpendicular to the direction of travel of the film 3. The individual imaging elements are in the form of microlenses, i.e., so-called Selfoc lenses, and sharply focus the film 3 on rows of sensing elements or cells 14a, 14b, 14c and 14d. Color filters 13b, 13c and 13d are disposed in front of the rows of sensing elements 14b, 14c and 14d, respectively. The color filters 13b–13d sensitize the corresponding rows of sensing elements 14b–14d to respective ones of the primary colors red, green and blue. The row of sensing elements 14a is not sensitized to any color and generates a gray value which can be used to measure density and to detect the strip-like regions which separate neighboring frames of the film 3 from one another.

The scanner 8 is movable back-and-forth across the window 6. To this end, the rows of focusing elements 31–34, the rows of sensing elements 14a–14d and the color filters 13b–13d, all of which constitute part of the scanner 8, are mounted on a carriage 35. A non-illustrated drive is provided to move the carriage 35 and the scanner 8 between a position indicated in full lines and a position shown by broken lines. The scanner 8 is located to the right of the window 6 in the full line position and to the left of the window 6 in the broken line position.

Instead of being movable, the scanner 8 can be fixedly mounted on one side of the window 6. In such a case, a reflector is provided to deflect light from the source 21 towards the scanner 8. The reflector is movable, e.g. pivotable, between a position outside of the optical path of the copier and a position in which the reflector extends across the optical path at an inclination so as to reflect light to the scanner 8. Such an arrangement is disclosed, for example, in the German publication 40 40 498.

Assuming that the diffusing disk 25 initially extends across the optical path and that the scanner 8 is initially to the right of the window 6, the operation of the photographic copier of the invention is as follows:

The control unit 29 is designed to switch the copier between a "scan" condition and a "copy" condition. When the leading end of a film traveling from left to right is engaged by the transport rollers 4, the control unit 29 places the copier in the "scan" condition. The crank drive 26,27 is activated and pivots the diffusing disk 25 about the axis 28 to the broken line position at one side of the optical path. The diffusing disk 25 is thus brought into a condition in which light in the optical path undergoes a relatively low degree of, or substantially no, diffusion. The light in the optical path is accordingly hard and more or less aligned. The scanner 8 is displaced so that the rows of focusing elements 31–34 and the rows of sensing elements 14a–14d are moved into the optical path where the rows of sensing elements 14a–14d can be exposed to the hard, aligned light in this path. It has been found that, by swinging the diffusing disk 25 out of, and moving the scanner 8 into, the optical path, the intensity of the scanning signals is increased twenty-fold over the intensity of the scanning signals of the German publication 42 05 922.

The film is now advanced to the transport rollers 5 which convey the film to the reel mentioned earlier. The film is scanned over its whole length by passing the entire film through the optical path.

Upon detection of the trailing end of the film the control unit 29 switches the copier to the "copy" condition. The diffusing disk 25 is pivoted back to the full line position in which the diffusing disk 25 traverses the optical path. The diffusing disk 25 is accordingly placed in a condition in which light in the optical path undergoes a relatively high degree of diffusion and is softened. The scanner 8 is moved out of the optical path to the right and into a position such that the row of focusing elements 31 and the associated row of sensing elements 14a are directly below a slit-shaped opening 7 in the support 9.

The direction of travel of the film is reversed and the film is transported from right to left in steps. Due to the alignment of the row of focusing elements 31 and the row of sensing elements 14a with the slit-shaped opening 7, the row of sensing elements 14a can detect the edges of the frames of the film thereby allowing each frame to be positioned in registry with the window 6. The frames are copied onto the copying paper 20 by the light in the optical path. Since the light is diffuse and soft, scratches and dirt particles on the frames are not reproduced.

The copier of the invention can also be used to scan and copy individual images which do not constitute part of a plurality of coherent frames or images. After securely positioning such an individual image in the window 6 in any suitable manner and pivoting the diffusing disk 25 out of the optical path, the scanner 8 is moved from right to left completely across the optical path. During the displacement of the scanner 8, the image in the window 6 is scanned. An individual image cannot be conveyed across the optical path by the rollers 4, 5, and movement of the scanner 8 across the optical path results in relative motion of the image and the sensing elements of the scanner 8. This relative motion is the same as that obtained when the scanner 8 is positioned in the optical path and a length of film is conveyed across the optical path by the transport rollers 4, 5.

Once scanning of the individual image in the window 6 has been completed, the scanner 8 is returned to its initial position and the image is copied in the same way as a frame of a film.

The diffusing disk 25 can be replaced by an NCAP foil. As indicated by the broken line extending from the control unit 29, the control unit 29 then operates to electrically switch the foil between a condition in which the foil diffuses light to a high degree and a condition in which the foil diffuses light to a lower degree or virtually not at all. The use of an NCAP foil instead of the diffusing disk 25 permits the number of mechanically movable components to be reduced.

Various modifications are possible within the meaning and range of equivalence of the appended claims.

I claim:

1. An apparatus for reproducing a master, comprising means for irradiating a predetermined path; means for supporting the master at a first location of said path; means for scanning at least part of said master at said first location to obtain data to be used in regulating the amount of copying light when said master is being reproduced; means for supporting a reproduction medium at a second location of said path; means for diffusing radiation; and means for (a) placing said diffusing means in a first condition when the master is being reproduced such that radiation in said path undergoes a first degree of diffusion and, (b) placing said diffusing means in a second condition when the master is being scanned such that radiation in said path undergoes a lower second degree of, or substantially no, diffusion whereby the master is scanned with relatively hard light and reproduced with relatively soft light.

2. The apparatus of claim 1, further comprising a reflector tube in said path having an upstream inlet end and a downstream outlet end; and wherein said diffusing means is mounted in the region of said outlet end.

3. The apparatus of claim 1, wherein said scanning means is movable between a first position outside of said path and a second position intermediate said first and second locations.

4. The apparatus of claim 1, wherein said diffusing means comprises a nematic curvular aligned phase device.

5. The apparatus of claim 1, wherein said diffusing means comprises a disk-like diffusing member movable between a first position at one side of said path and a second position in which said member substantially traverses said path.

6. The apparatus of claim 5, wherein said member has a pair of substantially parallel edges and is pivotable between said first and second positions about an axis essentially paralleling said edges.

7. The apparatus of claim 6, wherein said placing means comprises a crank for pivoting said member between said first and second positions.

8. The apparatus of claim 1, wherein said irradiating means and said diffusing means are designed so that radiation in said path is soft and diffuse downstream of said diffusing means in said first condition and hard and aligned downstream of said diffusing means in said second condition.

9. A method for reproducing a master, comprising the steps of directing radiation along a predetermined path;

scanning said master while in said path using said radiation to obtain data to be used in regulating the amount of copying light when said master is being reproduced; reproducing said master while in said path using said radiation and the results of the scanning step to regulate the amount of light during said reproducing step; and changing the degree of diffusion of said radiation between the scanning and reproducing steps such that said radiation has a first degree of diffusion during the reproducing step and a lower second degree of, or substantially no, diffusion during the scanning step whereby the master is scanned with relatively hard light and reproduced with relatively soft light.

* * * * *